United States Patent
Ruan

(10) Patent No.: US 8,302,751 B2
(45) Date of Patent: Nov. 6, 2012

(54) DRIVING SYSTEM FOR BELT AXIS OF WINCH

(75) Inventor: Buqin Ruan, Zhugang Town (CN)

(73) Assignee: Zhejiang Topsun Logistic Control Co., Ltd., Taizhou (CN)

( * ) Notice: Subject to any disclaimer, the term of this patent is extended or adjusted under 35 U.S.C. 154(b) by 548 days.

(21) Appl. No.: 12/608,038

(22) Filed: Oct. 29, 2009

(65) Prior Publication Data

US 2010/0300225 A1 Dec. 2, 2010

(30) Foreign Application Priority Data

May 26, 2009 (CN) .......................... 2009 1 0098982

(51) Int. Cl.
*F16D 41/18* (2006.01)
*B66D 1/04* (2006.01)
(52) U.S. Cl. ........ 192/46; 192/69.81; 254/217; 410/103
(58) Field of Classification Search ............... 192/69.81; 254/217, 223, 243, 244; 410/100, 103; 24/69 CT; 188/82.9
See application file for complete search history.

(56) References Cited

U.S. PATENT DOCUMENTS

| | | | | |
|---|---|---|---|---|
| 4,234,166 A | * | 11/1980 | Cederblad | .................. 24/68 CD |
| 5,101,537 A | * | 4/1992 | Cummings | ................. 24/68 CD |
| 7,559,729 B2 | * | 7/2009 | Ruan | .............................. 410/103 |
| 7,566,194 B1 | * | 7/2009 | Gray et al. | ..................... 410/103 |
| 2007/0267611 A1 | * | 11/2007 | Leone et al. | .................. 254/218 |

FOREIGN PATENT DOCUMENTS

CN 200410052805 3/2005

* cited by examiner

*Primary Examiner* — Richard M. Lorence
(74) *Attorney, Agent, or Firm* — Minder Law Group; Willy H. Wong

(57) ABSTRACT

The present invention discloses a driving system for a belt axis of a winch in the field of mechanics, which addresses the problems existing in conventional driving systems, such as a complicated structure and poor reliability. The driving system for the belt axis of the winch is positioned at the extension end of the belt axis on one side of a winch support. The driving system includes a rotary body and a fixed base, in which the fixed base is connected to the extension end of the belt axis via a connection means and the inner end of the rotary body is set on the fixed base. An insertion pore is positioned at the outer end of the rotary body. A spring is provided between the rotary body and the fixed base, under the action of which the inner end face of the rotary body is attached to the outer end face of the fixed base. A one-way clutch mechanism is disposed between the inner end face of the rotary body and the outer end face of the fixed base, which is formed by engagement of the one-way gear teeth on the surfaces. The rotary body could drive the fixed base to rotate therewith only when it runs in one direction by way of the one-way clutch mechanism. Therefore, the present invention has benefits such as improved reliability and convenient installation and maintenance.

5 Claims, 6 Drawing Sheets

DRIVING SYSTEM FOR BELT AXIS OF WINCH

BACKGROUND OF THE INVENTION

1. Field of Invention

The present invention relates to a winch, in particular, a driving system for a belt axis of a winch in the field of mechanics.

2. Related Art

Goods usually desire to be bound during transportation to prevent the goods falling off and colliding with each other to cause loss or damage during travel. Cords are conventionally directly used to bind the goods, which is work and time consuming and could hardly bind the goods tightly. The winch is an advanced binding means, the use of which to bind the goods is very popular among drivers due to convenience and safety.

The conventional winch is usually made of a support, a belt axis, a binding device and a driving system for the belt axis of the winch. The belt axis is connected to the support and rotatable. The binding device is wound around the belt axis. A crowbar hole is set on the outer end of the belt axis beyond the support.

The driving system for the belt axis is a core part of the winch, which takes an important role in use of the winch. The convention driving system for the belt axis of winch includes a fast rotating device for the belt axis of the winch as disclosed in Chinese Patent Application 200410052805.7. The fast rotating device includes a fixed base and a rotary body. The fixed base is fixedly connected to the belt axis. The rotary body is coupled to one side of the fixed base. A one-way link mechanism is provided at the contact face of the fixed base and the rotary body. At least one crowbar hole is set on the rotary body. The one-way link mechanism of the invention has a plurality of spring pores set on the rotary body at the contact face of the rotary body and the fixed base, within each of which a spring and a pillar are mounted. The pillars are pressed against the side of the fixed base by way of the springs. Chutes the number of which is the same as that of the spring pores are placed on the side of the fixed base at corresponding positions. One side of the chutes is an inclined face leaning toward one side along the rotation direction of the rotary body and extending to the side surface of the fixed base, and the other side is a vertical face perpendicular to the side surface of the fixed base.

In accordance with said patent, a plurality of sets of chutes, springs and pillars are required to make the rotary body bring the fixed base to rotate in one way, thereby to drive the belt axis to rotate. This structure has a few defects. Firstly, the device has a complicated structure and is relatively inconvenient to be installed due to the fact that the springs are relatively small and the number of them is relatively large. Secondly, it can not be guaranteed that each spring could work in a normal condition since many springs are used herein, in which case, all the springs have to be checked or replaced once one of them is out of use, bringing inconvenience in maintenance of the device.

SUMMARY OF THE INVENTION

One object of the invention is to provide a driving system for a belt axis of a winch with a simple configuration and higher reliability.

Said object of the invention could be achieved by a driving system for a belt axis of a winch positioned at the extension end of the belt axis on one side of a winch support. The driving system includes a rotary body and a fixed base, in which the fixed base is connected to the extension end of the belt axis via a connection means and the inner end of the rotary body is set on the fixed base. An insertion pore is positioned at the outer end of the rotary body. A spring is provided between the rotary body and the fixed base, under the action of which the inner end face of the rotary body is attached to the outer end face of the fixed base. A one-way clutch mechanism is disposed between the inner end face of the rotary body and the outer end face of the fixed base, which is formed by engagement of the one-way gear teeth on the surfaces. The rotary body could drive the fixed base to rotate therewith only when it runs in one direction by way of the one-way clutch mechanism.

According to the driving system for the belt axis of the winch, the rotary body is turned by a crowbar inserted in the insertion pore. The fixed base is driven to rotate by the one-way clutch mechanism when the rotary body is rotated in one direction. Apparently, the rotary body could be turned to drive the belt axis to rotate, in which case the binding device on the belt axis is tightened.

When the rotary body is rotated in a reverse direction, the belt axis could not be driven by the rotary body to rotate through the one-way clutch mechanism during rotation of the rotary body.

It is evident that the operator could drive the belt axis to turn in a single direction by swinging the crowbar to and fro when the goods are to be secured, so that the binding device on the belt axis is continually tightened.

According to the driving system for the belt axis of the winch, the connection means is accomplished by the fixed connection of the fixed base and the extension end of the belt axis by welding. The fixed base is fixedly connected with the extension end of the belt axis by welding, so that the belt axis could be brought to rotate by rotation of the fixed base.

The configuration of the one-way clutch mechanism could be implemented in several embodiments.

According to the first embodiment, in the driving system for the belt axis of the winch, the one-way clutch mechanism has several ratchets integrated with the rotary body and several ratchets combined with the fixed base, in which the inclined direction of teeth of the ratchets of the fixed base is opposite to that of those of the rotary body.

The teeth of the ratchets at the rotary body are matched with those at the fixed base. During rotation of the rotary body, the teeth of the ratchets at the fixed base are driven by the teeth of the ratchets at the rotary body to drive the fixed base to rotate. The ratchets at the fixed base could be driven by the ratchets at the rotary body only when they are rotating in one direction due to the fact that the inclined direction of the teeth of the ratchets of the fixed base is in opposition to that of those of the rotary body.

According to the second embodiment, in the driving system for the belt axis of the winch, the one-way clutch mechanism includes several ratchets integrated with the rotary body and a convex body projected from one end of the fixed base. The rotary body is turned to drive the fixed base to rotate by bringing the teeth of the ratchets at the rotary body to move the convex body. The fixed base could be driven by the ratchets at the rotary body to rotate only when they are rotating in one direction because the teeth of the ratchets are toward to a single direction.

According to the third embodiment, in the driving system for the belt axis of the winch, the one-way clutch mechanism includes a convex body projected from one end of the rotary body and several ratchets combined with the rotary body. The rotary body is turned to drive the fixed base to rotate by bringing the convex body to move the teeth of the ratchets at the fixed base. The fixed base could be driven by the convex body at the rotary body to rotate only when it is rotating in one direction because the teeth of the ratchets are toward to a single direction.

According to the driving system for the belt axis of the winch, the number of the spring is one. Said system has a simple structure and could be conveniently installed and maintained by making the rotary body against the fixed base through one spring acting between the rotary body and the fixed base.

According to the driving system for the belt axis of the winch, a seal ring is covered on the outer side of the fixed base and the rotary body, which seals the connection part of the fixed base and the rotary body. In this case, the circumferential dust and impurities could be prevented from entering into the driving system with aid of the seal ring.

According to the driving system for the belt axis of the winch, a projected spring post is provided at one end of the fixed base. A projected shoulder is placed at one end of the spring post. The aforementioned spring is covered on the spring post and both ends of the spring are pressed against the inner end of the rotary body and the shoulder respectively. In particular, one end of the spring acts on the inner side of the rotary body and the other end thereof acts on the fixed base through the shoulder. That is to say, the ends of the fixed base and the rotary body are pressed against each other under the force of the spring.

According to the driving system for the belt axis of the winch, a seal gasket is provided between the shoulder and the rotary body. The seal gasket is set at the shoulder. A seal is formed between the shoulder and the rotary body by the seal gasket to inhibit entrance of the circumferential dust.

According to the driving system for the belt axis of the winch, the shoulder is configured as a round disk and fixedly connected to the end of the spring post. The edge portion of the shoulder extends out of the spring post. The round disk shaped shoulder is so fixedly connected to the end of the spring post via a bolt that the connection therebetween is more reliable. The edge portion of the shoulder extends out of the spring post and the extended portion of the shoulder could be connected with the spring.

According to the driving system for the belt axis of the winch, an oil filling port is formed at the side of the rotary body. The oil filling port is communicated with the cavity formed between the seal gasket and the seal ring. Lubricating grease is fed into the cavity via the oil filling port to lubricate the ratchets and the spring.

According to the driving system for the belt axis of the winch, a stopper edge is provided at the inner side of the rotary body, which is projected inside. A gasket is further set on the spring post, which is pressed between the spring and the stopper edge. Therefore, the force undertaking area of the stopper edge is increased by the gasket.

As an alternative, according to the driving system for the belt axis of the winch, the connection means includes several through holes on the extension end of the belt axis, a cavity at one end of the fixed base which could accommodate the extension end of the belt axis, through holes set on the sidewall of the cavity the number and positions of which correspond to the number and positions of said through holes on the extension end of the belt axis, and several pins set between the cavity and the extension end of the belt axis which could be inserted into all the aforementioned through holes simultaneously.

The fixed base could be conveniently connected with the extension end of the belt axis of the winch through the through holes thereon. That is to say, the driving system is expediently installed on the belt axis of the winch when the pins are positioned through the through holes of the fixed base and those of the extension end of the belt axis at the same time. The pins could be pulled out from the through holes when the driving system is required to be removed. Moreover, the rotary body of a common winch could be placed in the cavity and fixedly connected to the fixed base of the driving system for the belt axis of the winch via pins. In this case, the belt axis could be turned in one way by swinging the crowbar to and forth in the common winch, thereby the binding device on the belt axis being continuously tightened.

According to the driving system for the belt axis of the winch, both the number of the through holes on the fixed base and that of those on the extension end of the belt axis are four, and the number of the pins is two. Said two pins are inserted into the four through holes in a crisscross, in which way the fixed base could be preferably fixedly connected to the belt axis.

The driving system for the belt axis of the winch has several advantages over prior art. Firstly, the fixed base is driven by the rotary body to rotate in a single direction through several ratchets integrated with the rotary body and several ratchets combined with the fixed base. Secondly, only one spring is required between the rotary and the fixed base of the driving system, to provide the driving system of the invention with a simple structure, which could be conveniently installed and maintained.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

First Embodiment

The technical schemes of the invention will be further described in combination with detailed embodiments and accompanying figures. However, said invention is not limited to these embodiments.

Figure 2:
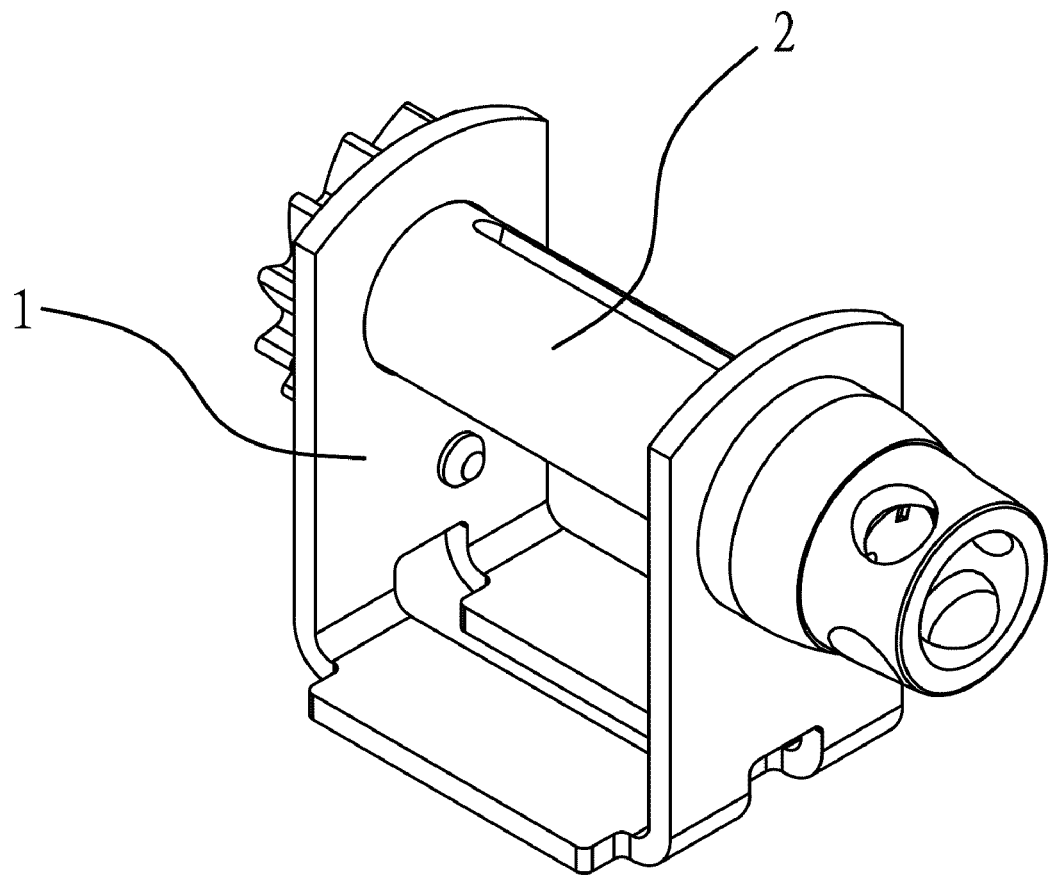
FIG. 2 is a stereoscopic structural diagram of the driving system for the belt axis of the winch.

As shown in FIG. 2, a winch includes a winch support 1, a belt axis 2 and a binding device. The belt axis 2 is connected to the winch support 1 and could rotate around the axial direction. The binding device is linked to the belt axis 2.

Figure 1:
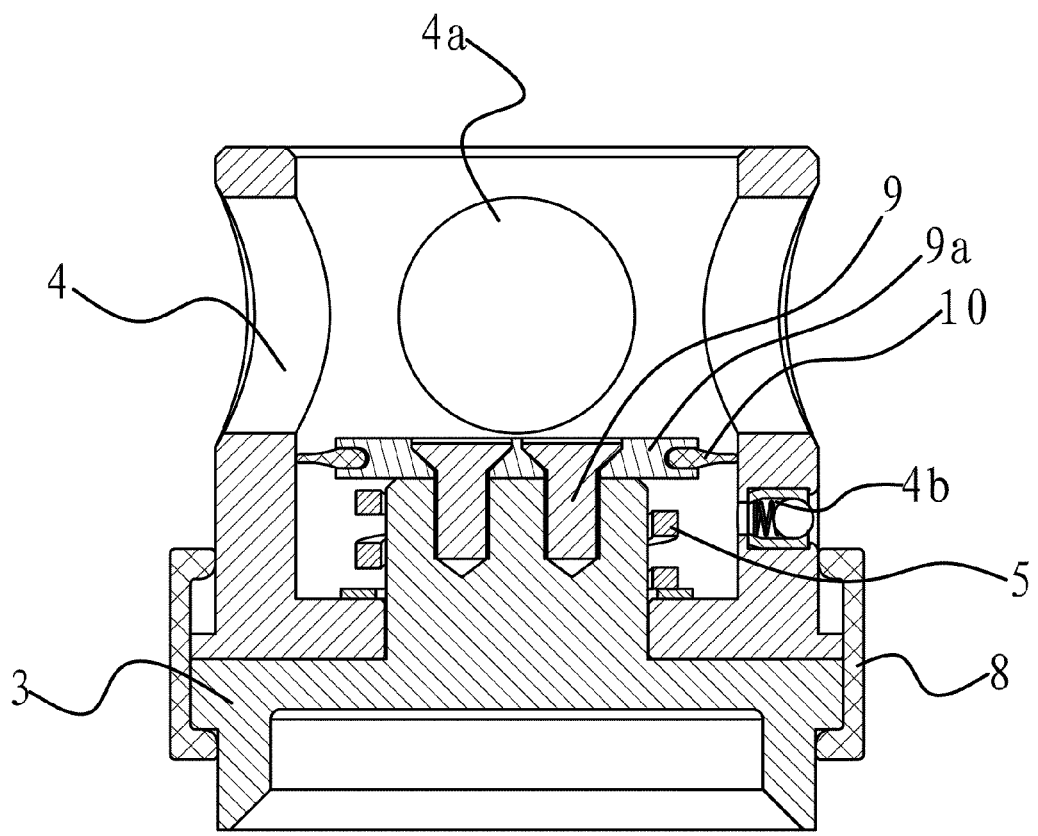
FIG. 1 is a structural diagram of a driving system for a belt axis of a winch.
Figure 3:
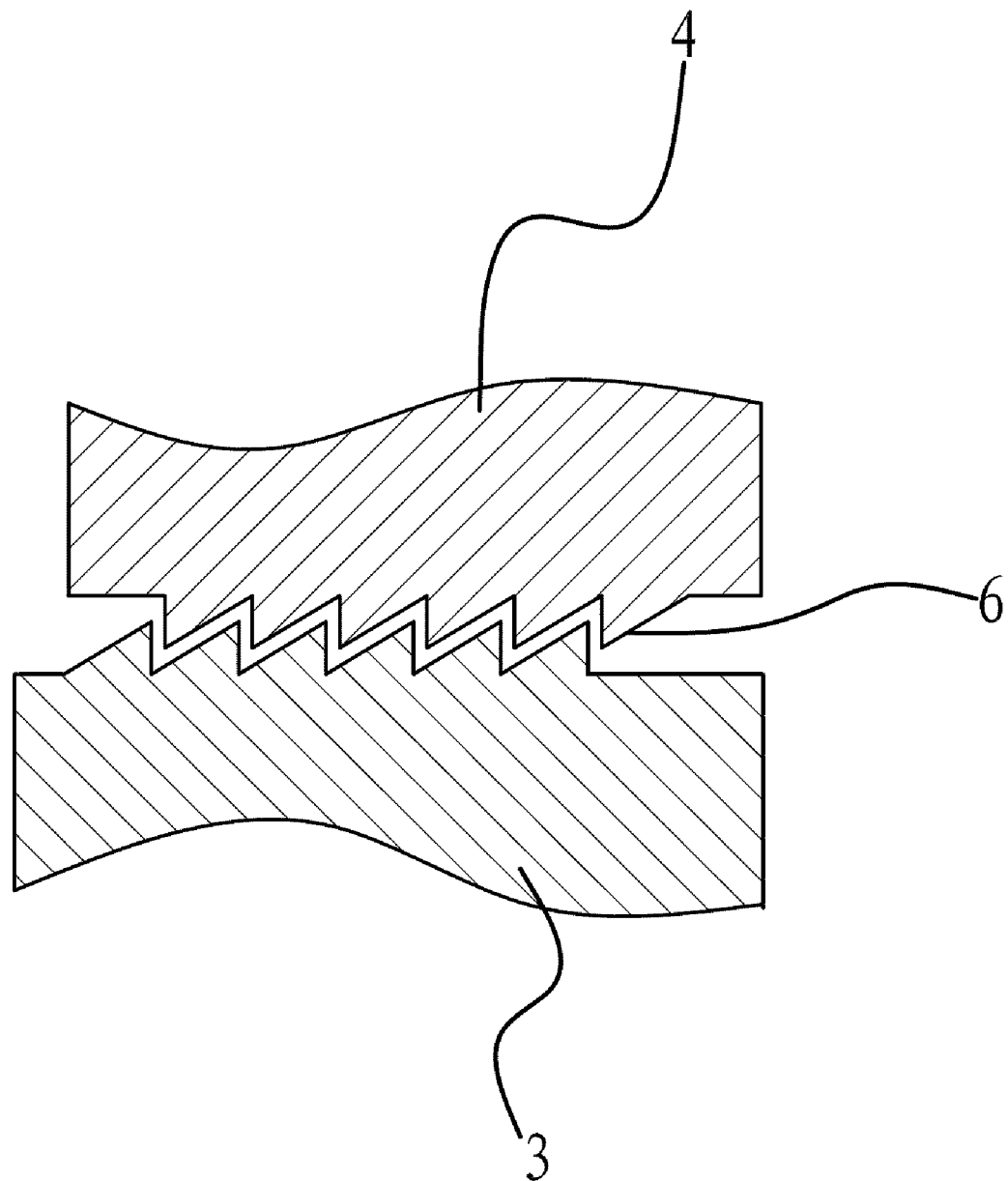
FIG. 3 is a partial structural diagram of the first embodiment of the driving system for the belt axis of the winch.

In FIGS. 1 and 3, the driving system for the belt axis of the winch of the invention is disposed on the extension end of the belt axis 2 on one side of the winch support 1. Said system has a fixed base 3 and a rotary body 4, in which the fixed base 3 is fixedly connected to the extension end of the belt axis 2 and the inner end of the rotary body 4 is set on the fixed base 3. An insertion pore 4a is positioned at the outer end of the rotary body 4. A spring 5 is provided between the rotary body 4 and the fixed base 3, under the action of which the inner end face of the rotary body 4 is attached to the outer end face of the fixed base 3. A one-way clutch mechanism is disposed between the inner end face of the rotary body 4 and the outer end face of the fixed base 3, which is formed by engagement of the one-way gear teeth on the surfaces. The rotary body 4 could drive the fixed base 3 to rotate therewith only when it runs in one direction by way of the one-way clutch mechanism.

In particular, the one-way clutch mechanism of the driving system for the belt axis of the winch of the invention includes six ratchets 6 integrated with the rotary body 4 and six ratchets 6 combined with the fixed base 3. The inclined direction of the teeth of the ratchets 6 of the fixed base 3 is opposite to that of those of the rotary body 4. The teeth of the ratchets 6 at the rotary body 4 are matched with those at the fixed base 3. During rotation of the rotary body 4, the teeth of the ratchets 6 at the fixed base 3 are driven by the teeth of the ratchets 6 at the rotary body 4 to drive the fixed base 3 to rotate. The ratchets 6 at the fixed base 3 could be driven by the ratchets 6 at the rotary body 4 only when they are rotating in one direction due to the fact that the inclined direction of the teeth of the ratchets 6 of the fixed base 3 is in opposition to that of those of the rotary body 4.

In the driving system for the belt axis of the winch of the invention, the number of the spring 5 is one. Said system has a simple structure and could be conveniently installed and maintained by making the rotary body against the fixed base through one spring acting between the rotary body and the fixed base.

A seal ring 8 is covered on the outer side of the fixed base and the rotary body 4, which seals the connection part of the fixed base 3 and the rotary body 4. In this case, the circumferential dust and impurities could be prevented from entering into the driving system with aid of the seal ring 8. A projected spring post 9 is provided at one end of the fixed base 3. A projected shoulder 9a is placed at one end of the spring post 9. The aforementioned spring 5 is covered on the spring post 9 and both ends of the spring 5 are pressed against the inner end of the rotary body 4 and the shoulder 9a respectively. In particular, one end of the spring 5 acts on the inner side of the rotary body 4 and the other end thereof acts on the fixed base 3 through the shoulder 9a. That is to say, the ends of the fixed base 3 and the rotary body 4 are pressed against each other under the force of the spring 5.

A seal gasket 10 is provided between the shoulder 9a and the rotary body 4. The seal gasket 10 is set at the shoulder 9a. A seal is formed between the shoulder 9a and the rotary body 4 by the seal gasket 10 to inhibit entrance of the circumferential dust. The shoulder 9a is configured as a round disk and fixedly connected to the end of the spring post 9. The edge portion of the shoulder 9a extends out of the spring post 9. The round disk shaped shoulder 9a is so fixedly connected to the end of the spring post 9 via a bolt that the connection therebetween is more reliable. The edge portion of the shoulder 9a extends out of the spring post 9 and the extended portion of the shoulder 9a could be connected with the spring 5.

An oil filling port 4b is formed at the side of the rotary body 4. The oil filling port 4b is communicated with the cavity formed between the seal gasket 10 and the seal ring 8. Lubricating grease is fed into the cavity via the oil filling port 4b to lubricate the ratchets 6 and the spring 5. A stopper edge is provided at the inner side of the rotary body, which is projected inside. A gasket is further set on the spring post 9, which is pressed between the spring 5 and the stopper edge. Therefore, the force undertaking area of the stopper edge is increased by the gasket.

In the driving system for the belt axis of the winch of the invention, the rotary body 4 is turned by a crowbar inserted in the insertion pore 4a. The fixed base 3 is driven to rotate by the one-way clutch mechanism when the rotary body 4 is rotated in one direction. Apparently, the rotary body 4 could be turned to drive the belt axis 2 to rotate, in which case the binding device on the belt axis 2 is tightened. When the rotary body 4 is rotated in a reverse direction, the belt axis 2 could not be driven by the rotary body 4 to rotate through the one-way clutch mechanism during rotation of the rotary body 4. It is evident that the operator could drive the belt axis 2 to turn in a single direction by turning the crowbar to and fro when the goods are to be secured, so that the binding device on the belt axis 2 is continually tightened.

Second Embodiment

Figure 4:
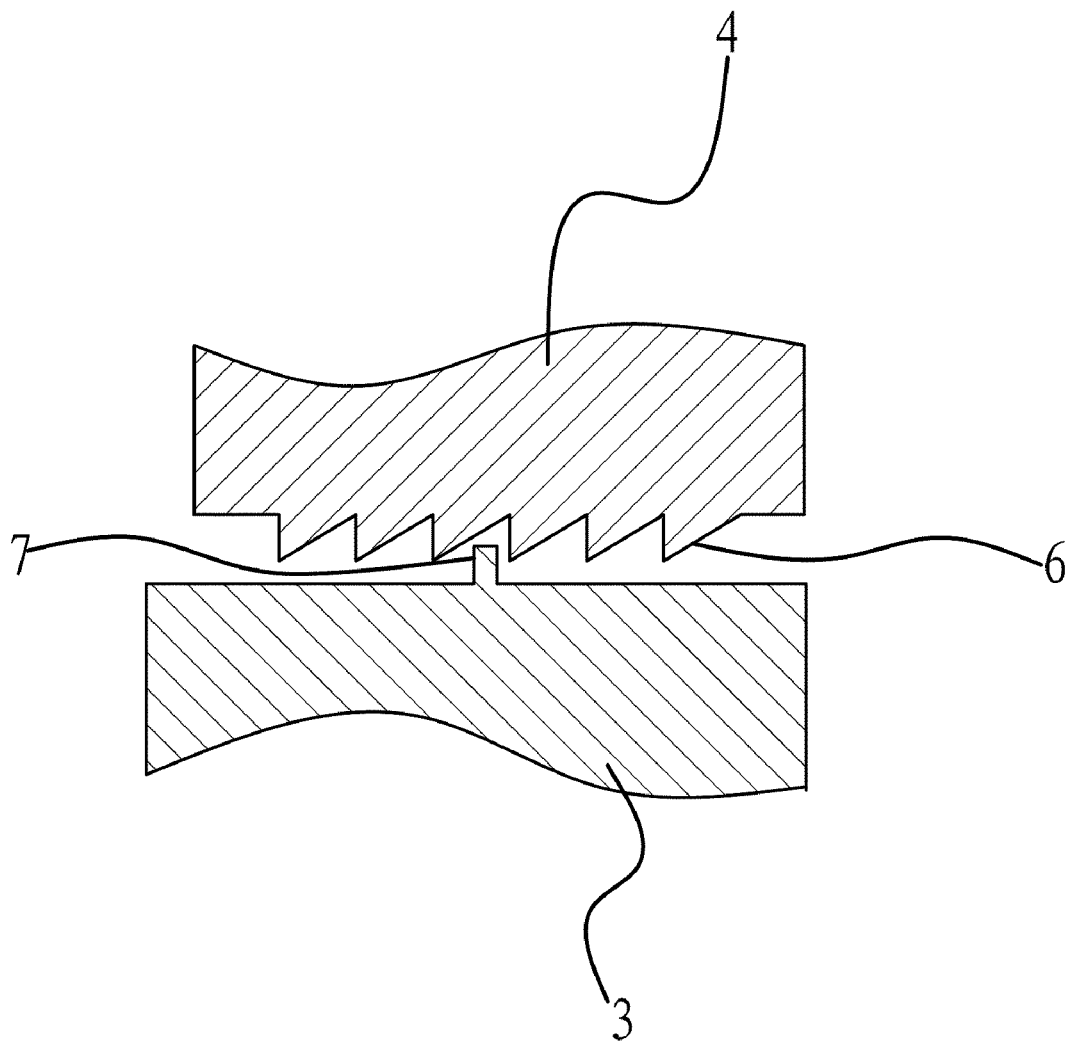
FIG. 4 is a partial structural diagram of the second embodiment of the driving system for the belt axis of the winch.

The second embodiment is substantially identical to the first one with the exception in that the one-way clutch mechanism of the driving system has six ratchets 6 integrated with the rotary body 4 and six ratchets 6 combined with the fixed base 3 and the inclined direction of the teeth of the ratchets 6 of the fixed base 3 is opposite to that of those of the rotary body 4 in the first embodiment, while the one-way clutch mechanism (shown in FIG. 4) has six ratchets 6 integrated with the rotary body 4 and a convex body 7 projected from one end of the fixed base 3 in the second embodiment. The rotary body 4 is turned to drive the fixed base 3 to rotate by bringing the teeth of the ratchets 6 at the rotary body 4 to move the convex body 7. The fixed base 3 could be driven by the ratchets 6 at the rotary body 4 to rotate only when they are rotating in one direction because the teeth of the ratchets 6 are toward to a single direction.

Third Embodiment

Figure 5:
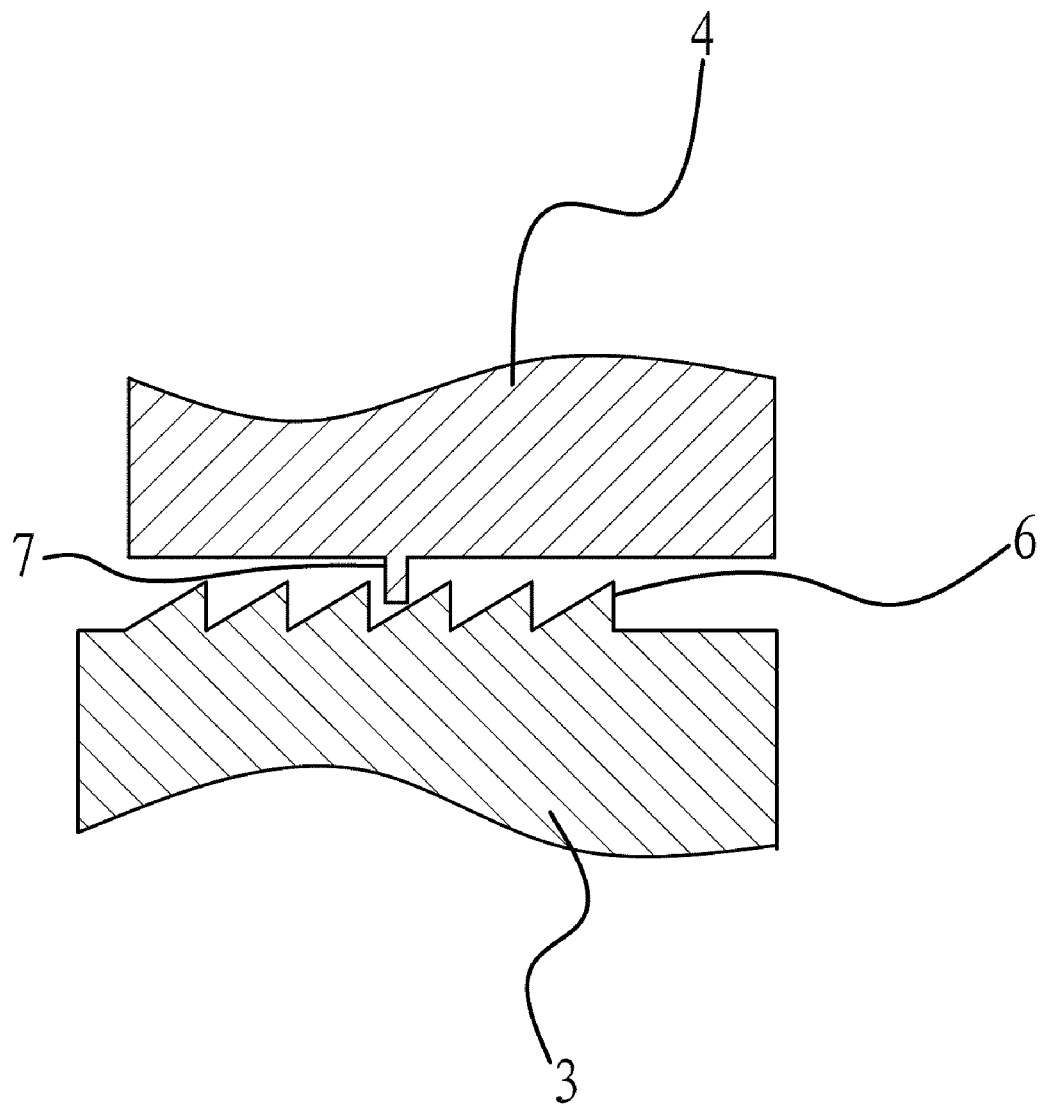
FIG. 5 is a partial structural diagram of the third embodiment of the driving system for the belt axis of the winch.
Figure 6:
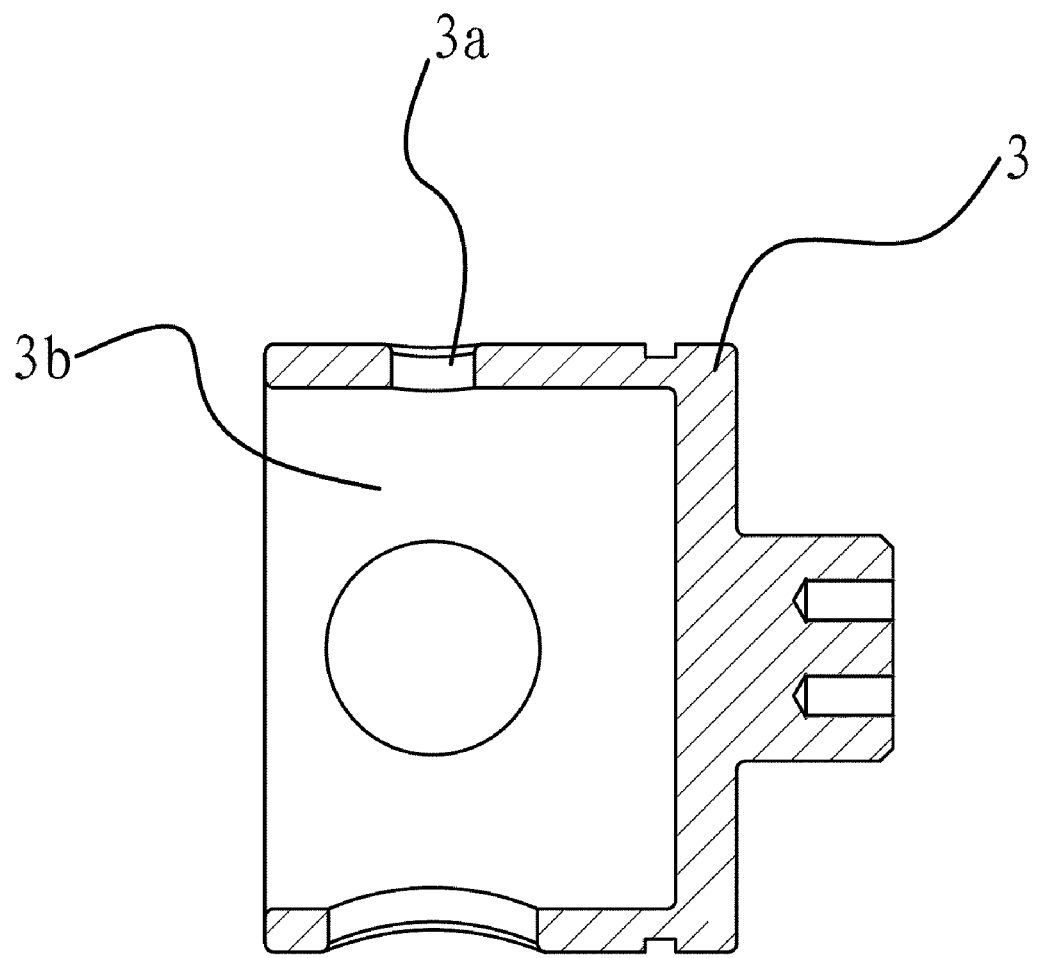
FIG. 6 is a structural diagram of a fixed base of the driving system for the belt axis of the winch.

The third embodiment is substantially identical to the first one with the exception in that the one-way clutch mechanism of the driving system has six ratchets 6 integrated with the rotary body 4 and six ratchets 6 combined with the fixed base 3 and the inclined direction of the teeth of the ratchets 6 of the fixed base 3 is opposite to that of those of the rotary body 4 in the first embodiment, while the one-way clutch mechanism (shown in FIG. 5) has a convex body 7 projected from one end of the rotary body 4 and six ratchets 6 combined with the fixed base 3 in the third embodiment. The rotary body 4 is turned to drive the fixed base 3 to rotate by bringing the convex body 7 to move the teeth of the ratchets 6 at the fixed base 3. The fixed base 3 could be driven by the convex body 7 at the rotary body 4 to rotate only when it is rotating in one direction because the teeth of the ratchets 6 are toward to a single direction.

Fourth Embodiment

The fourth embodiment is substantially identical to the first embodiment with the exception that the fixed base 3 is directly fixedly connected to the extension end of the belt axis by welding in the first embodiment while the connection of the fixed base 3 and the belt axis 2 is accomplished by several through holes on the extension end of the belt axis, a cavity 3b at one end of the fixed base 3 which could accommodate the extension end of the belt axis, through holes 3a set on the sidewall of the cavity 3b the number and positions of which correspond to the number and positions of said through holes on the extension end of the belt axis, and several pins set between the cavity 3b and the extension end of the belt axis which could be inserted into all the aforementioned through holes simultaneously. In particular, both the number of the through holes 3a on the fixed base 3 and that of those on the extension end of the belt axis are four, and the number of the pins is two. Said two pins are inserted into the four through holes in a crisscross, in which way the fixed base 3 could be preferably fixedly connected to the belt axis 2.

The fixed base 3 could be conveniently connected with the extension end of the belt axis 2 of the winch through the through holes thereon. That is to say, the driving system is expediently installed on the belt axis 2 of the winch when the pins are positioned through the through holes of the fixed base 3 and those of the extension end of the belt axis 2 at the same time. The pins could be pulled out from the through holes when the driving system is required to be removed. Moreover, the rotary body of a common winch could be placed in the cavity 3b and fixedly connected to the fixed base 3 of the driving system for the belt axis 2 of the winch via pins. In this case, the belt axis 2 could be turned in one way by swinging the crowbar to and forth in the common winch, thereby the binding device on the belt axis being continuously tightened.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Although technical terms are used herein, such as winch support 1, belt axis 2, fixed base 3, through hole 3a, cavity 3b, rotary body 4, insertion pore 4a, oil filling port 4b, spring 5, ratchet 6, convex body 7, seal ring 8, spring post 9, shoulder 9a and seal ring 10, the other similar terms could also be used. These terms are merely used to describe and explain the essence of the invention more conveniently, and any limitation to said terms is regarded as departing from the spirit of the invention.

LIST OF REFERENCE NUMERALS

1 winch support
2 belt axis
3 fixed base
3a through hole
3b cavity
4 rotary body
4a insertion pore
4b oil filling port
5 spring
6 ratchet
7 convex body
8 seal ring
9 spring post
9a shoulder
10 seal gasket

What is claimed is:

1. A driving system for a belt axis of a winch positioned at an extension end of the belt axis on one side of a winch support, comprising:
    a fixed base and a rotary body, in which the fixed base is connected to the extension end of the belt axis via a connection means, an inner end of the rotary body is set on the fixed base, and an insertion pore is positioned at an outer end of the rotary body, characterized in that a spring is provided between the rotary body and the fixed base, an inner end face of the rotary body is attached to an outer end face of the fixed base under the action of the spring, a one-way clutch mechanism is disposed between the inner end face of the rotary body and the outer end face of the fixed base which is formed by engagement of one-way gear teeth on a surface of the rotary body or the fixed base; and
    a projected spring post is provided at one end of the fixed base, a projected shoulder is placed at one end of the spring post, and the spring is covered on the spring post and both ends of the spring are pressed against the inner end of the rotary body and the shoulder respectively;
    wherein the rotary body is capable of driving the fixed base to rotate therewith only when it runs in one direction by way of the one-way clutch mechanism.

2. The driving system for the belt axis of the winch as claimed in claim 1, characterized in that a seal gasket is provided between the shoulder and the rotary body, and the seal gasket is set at the shoulder.

3. The driving system for the belt axis of the winch as claimed in claim 2, characterized in that the shoulder is configured as a round disk and fixedly connected to the end of the spring post, and the edge portion of the shoulder extends out of the spring post.

4. A driving system for a belt axis of a winch positioned at an extension end of the belt axis on one side of a winch support, comprising:
    a fixed base and a rotary body, in which the fixed base is connected to the extension end of the belt axis via a weld, an inner end of the rotary body is set on the fixed base, and an insertion pore is positioned at an outer end of the rotary body, characterized in that a spring is provided between the rotary body and the fixed base, an inner end face of the rotary body is attached to an outer end face of the fixed base under the action of the spring, a one-way clutch mechanism is disposed between the inner end face of the rotary body and the outer end face of the fixed base which is formed by engagement of one-way gear teeth on a surface of the rotary body or the fixed base; and
    a projected spring post is provided at one end of the fixed base, a projected shoulder is placed at one end of the spring post, and the spring is covered on the spring post and both ends of the spring are pressed against the inner end of the rotary body and the shoulder respectively;
    wherein the rotary body is capable of driving the fixed base to rotate therewith only when it runs in one direction by way of the one-way clutch mechanism.

5. The driving system for the belt axis of the winch as claimed in claim 4, characterized in that a seal gasket is provided between the shoulder and the rotary body, and the seal gasket is set at the shoulder.

\* \* \* \* \*